United States Patent

[11] 3,578,906

[72] Inventors Larry W. Holmstrom
Vestal;
James A. Tuttle, Endicott; Harold J. Young, Vestal, N.Y.

[21] Appl. No. 879,482
[22] Filed Nov. 24, 1969
[45] Patented May 18, 1971
[73] Assignee International Business Machines Corporation
Armonk, N.Y.

[54] CLOSE CIRCUIT TELEVISION MEASUREMENT SYSTEM
10 Claims, 24 Drawing Figs.

[52] U.S. Cl. ........................................................ 178/6
[51] Int. Cl. ........................................................ H04n 7/18
[50] Field of Search ........................................... 178/61 (ND), 6 (TT), 6.8

[56] References Cited

UNITED STATES PATENTS

| | | | |
|---|---|---|---|
| 2,764,698 | 9/1956 | Knight .......................... | 178/6.8 |
| 3,507,991 | 4/1970 | Scotchie et al. .............. | 178/6.8 |

*Primary Examiner*—Robert L. Griffin
*Assistant Examiner*—Barry L. Leibowitz
*Attorneys*—Hanifin & Jancin and Gerald R. Gugger

ABSTRACT: A system designed to make linear measurements of an optical image in either a vertical direction or a horizontal direction for use in printed circuit manufacture wherein line-width and line-spacing measurements of printed circuits are made before and after etch.

*INVENTOR.*
LARRY W. HOLMSTROM
JAMES A. TUTTLE
HAROLD J. YOUNG

*BY* G. R. Gugger
*AGENT*

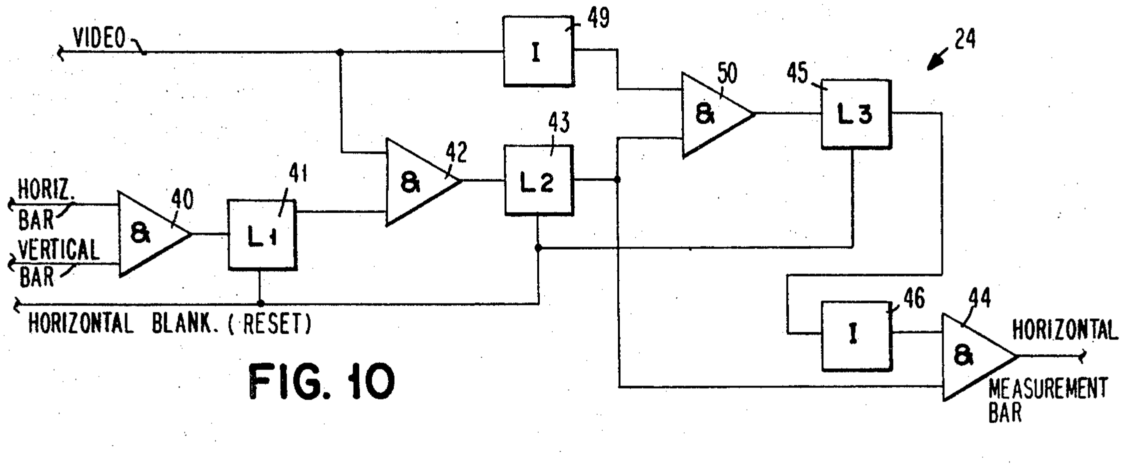
FIG. 10
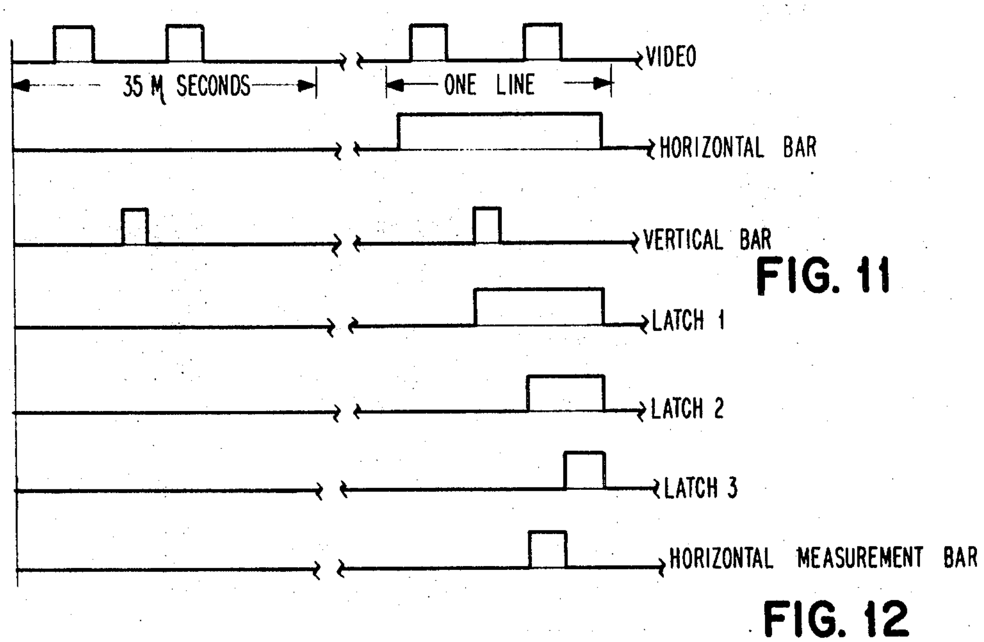
FIG. 11
FIG. 12
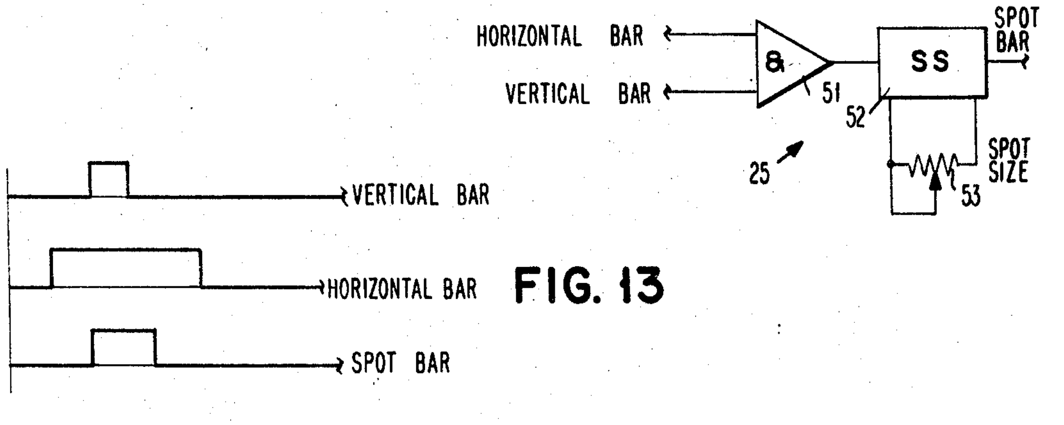
FIG. 12, FIG. 13

CLOSE CIRCUIT TELEVISION MEASUREMENT SYSTEM

BACKGROUND OF THE INVENTION

The invention is in the field of quality control in the production of printed-circuit boards. In the manufacture of printed-circuit boards visual inspections are made so that circuit defects can be located and repaired. Also, as the production quantities of circuit boards increased and the number of circuit lines on a board increased necessitating narrower lines and a greater need for close tolerances and accuracy, the ability to perform line-width measurements was incorporated. These measurements are used to maintain quality control of production, to check the operation of the processing equipment used and to analyze printed circuit development.

The philosophy behind performing measurements is to allow an operator the flexibility of randomly selecting the specimen to be measured. However, once the specimen has been selected the accuracy of the measurement should be independent of the operator. In the past, printed circuits were either inspected by an engineer and microscope or by a trained inspector and microscope. Both of these techniques proved time consuming and human judgment caused great variations in recorded line-width measurements from inspector to inspector as well as for the same inspector from day to day. Also, there have been television measurement systems on the market which could be used to measure printed-circuit lines in a more preferred and useful manner by producing an image of the part to be measured and converting the image to electrical signals from which a quantitative measurement could be derived. However, it was found that these prior systems did not provide the degree of accuracy required due to the face that a considerable amount of human intervention and human judgement were required to carry out the measurement, particularly in the manual selection of the portion of the image that is to be measured.

The problem presented then is to find some way to provide a television type measurement system adapted to measure printed-circuit lines which is highly accurate, which requires only an insignificant amount of human judgment on the part of the operator to set up that portion of the image which is to measured, and which after selection automatically performs the measurement without human intervention.

SUMMARY OF THE INVENTION

The inventors have devised an improved close circuit television measurement system for making linear measurements of an optical image in either a vertical direction or a horizontal direction and which is particularly adapted to make 0.005 inch line-width and line-spacing measurements of printed circuits. In its broad aspects, the system includes a television camera which picks up the image of the part being measured. This video information is delivered to a logic control unit and to a television monitor tube. The logic control unit allows the operator to select and to perform the measurement. The monitor tube provides a visual display of the part to be measured and assists the operator premeasure alignment. A counter is controlled by the logic unit to provide the quantitative measurement.

The horizontal measurement is made by measuring the width of a pulse taken from the video signal. The scale factor for converting pulse width to inches is determined from a known line width. On the other hand, the vertical measurement is made by counting the number of horizontal scan lines. The use of a raster scan mode to make the vertical measurement is considered to be one of the unique features of the present system.

In order to make a measurement the operator selects whether a vertical or horizontal measurement is to be made. Then, he displays a horizontal bar and a vertical bar on the monitor and positions them in a prescribed location depending upon where he wants the measurement taken. The measurement is then automatically performed independent of the operator and observed on a digital readout. Another important feature of the present system resides in the fact that the operator is only required to position the horizontal and vertical bars in the so-called ballpark area of where the measurement is to be made. This greatly reduces the amount of human judgement required thus enhancing the accuracy as well as the speed of the operation. The present system was evaluated when measuring 0.005 inch printed-circuit lines and it was shown that 3 percent accuracy can be obtained.

The present system also has the feature of providing an electronic overlay which is displayed on the monitor at where the measurement is made. This assures the operator that the measurement is being taken from the desired position.

It is, then a primary object of this invention to provide a novel and improved close circuit television measurement system for making linear measurements of an optical image in either a vertical direction or a horizontal direction.

A further object of this invention is to provide a novel and improved close circuit television measurement system which is particularly adapted to make line-width and line-spacing measurements of printed circuits.

Another object of this invention is to provide a novel and improved close circuit television measurement system which is particularly suited for microscopic measurements and which can be readily adapted to most close circuit television systems.

A still further object of this invention is to provide a novel and improved close circuit television measurement system for making linear measurements of an optical image in either a vertical direction or a horizontal direction and where in the horizontal measurement is made by measuring the width of a pulse taken from the video signal and the vertical measurement is made by counting the number of horizontal scan lines.

Another object of the present invention is to provide a novel and improved close circuit television measurement system for making linear measurements of an optical image in either a vertical direction or a horizontal direction and having electronic overlay means visible to the operator for showing precisely where the measurement is being taken.

A still further object of the present invention is to provide a novel and improved close circuit television measurement system for making linear measurements of an optical image in either a vertical direction or a horizontal direction and wherein the operator need only position a vertical and horizontal bar in the so-called ballpark area of where the measurement is to be made thus greatly reducing he amount of human judgment required.

A further object of the present invention is to provide a novel and improved close circuit television measurement system for making linear measurements of an optical image in either a vertical direction or a horizontal direction wherein after manual selection of the part to be measured the measurement is automatically performed and displayed on a digital readout without human intervention.

The foregoing and other objects, features and advantages of the invention will be apparent from the following more particular description of the preferred embodiment of the invention as illustrated in the accompanying drawings.

BRIEF DESCRIPTION OF THE DRAWINGS

FIG. 10 is a block diagram of the horizontal measurement bar generator in the control unit.

FIG. 11 is a diagram illustrating the wave forms at various points of the circuit shown in FIG. 10.

FIG. 12 is a block diagram of the spot generator in the control unit.

FIG. 13 is a diagram illustrating the wave forms at various points of the circuit shown in FIG. 12.

DESCRIPTION OF PREFERRED EMBODIMENT

Figure 1A:
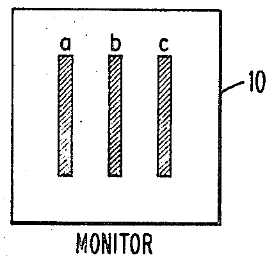
FIGS. 1*a*, 1*b*, 1*c* and 1*d* represent diagrams showing the technique used to make a horizontal measurement.
Figure 1B:
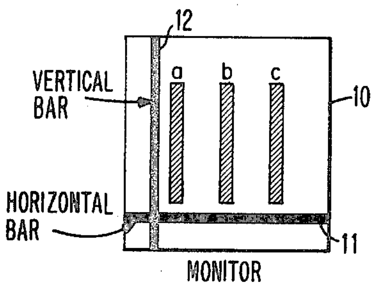
Figure 1C:
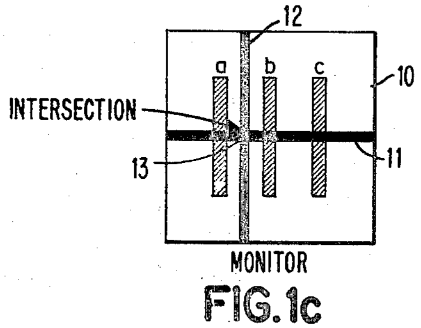
Figure 1D:
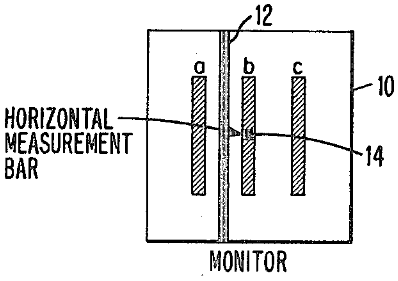

Referring to FIGS. 1*a* through 1*d*, the illustrations shown demonstrate how a typical horizontal measurement is made. For example, when dealing with printed circuits, the operator first selects the area involving the line-width to be measured and places it in view of the television camera and the resulting image is displayed on the television monitor tube 10 as illustrated by the vertical lines *a*, *b* and *c* in FIG. 1*a*. Then, as shown in FIG. 1*b*, a horizontal bar 11 and a vertical bar 12 are displayed on the monitor. These bars are used by the operator to select the position of where the measurement will be made. In the next step illustrated in FIG. 1*c*, the intersection 13 of the horizontal and vertical bars is placed to the left of the line to be measured. The only restriction imposed on the operator here is that the intersection be placed to the left of the line but to the right of an adjacent line. For example, in order to measure the width of line *b*, the intersection must occur between lines *a* and *b*. Otherwise, if the intersection occurs to the left of line *a* then the width of line *a* would be measured and if the intersection occurred between lines *b* and *c*, then line *c* would be measured. An important point to note is that the intersection may occur anywhere to the left of the line with the above restriction observed. In the fourth step, illustrated in FIG. 1*d*, the horizontal bar is turned off and a horizontal measurement bar 14 is turned on. In order to record a measurement, this step is not necessary; however, by displaying the measurement bar the operator can determine whether or not the electronics are functioning properly. The horizontal measurement bar acts as an overlay to shown where the measurement starts and stops. Finally, the width of line *b* is determined from heating the pulse width of the horizontal measuring bar 14. The pulse width measurement is displayed on a time-interval counter and is then converted to inches with X inches = (constant) (pulse width). This conversion can be eliminated by using an external clock with the counter, wherein, the constant can be made to equal one.

Figure 2A:
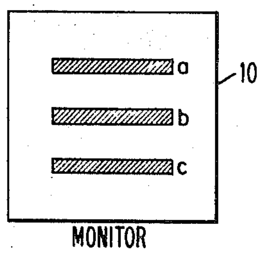
FIGS. 2*a*, 2*b*, 2*c* and 2*d* represent diagrams showing the technique used to make a vertical measurement.
Figure 2B:
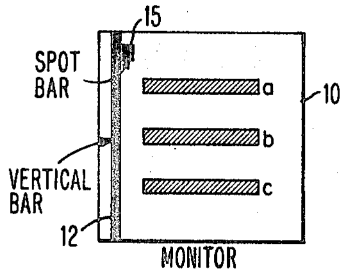
Figure 2C:
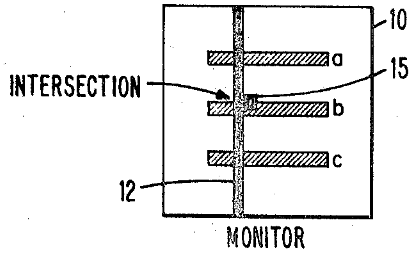
Figure 2D:
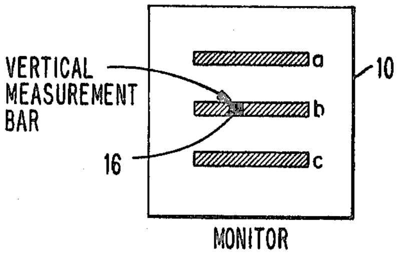

The method used to make a typical vertical measurement is illustrated in FIGS. 2*a* through 2*d*. As was the case when making a horizontal measurement, the operator first selects the area involving the line-width to be measured and places it in view of the television camera and the resulting image is displayed on the television monitor tube 10 as illustrated by the horizontal lines *a*, *b* and *c* in FIG. 2*a*. Then, as shown in FIG. 2*b*, a vertical bar 12 and a spot bar 15 are displayed on the monitor. Here again, these bars are used by the operator to select the position of where the measurement will be made. In the next step illustrated in FIG. 2*c*, the vertical bar is positioned over the line to be measured and the spot bar is moved such that it intersects the top edge of the line which is shown as line *b*. The position of the spot bar is not critical because it can be made quite large and the only restriction is that some portion of the spot bar 15 intersect the top edge of the line to be measured. The spot bar automatically follows the vertical bar; therefore, the spot moves up and down the vertical bar. In the fourth step, illustrated in FIG. 2*d*, the vertical bar and spot bar are turned off and a vertical measurement bar 16 is turned on. Here again, in order to record the measurement this step is not necessary; however, by displaying the measurement bar the operator can determine whether or not the electronics are functioning properly and the vertical measurement bar acts as an overlay to shown where the measurement starts and stops. Finally, the width of line *b* is determined by summing the number of horizontal scan lines that pass through the vertical measuring bar 16 for a full raster frame. This events count is then converted to inches wherein Y inches = (constant) (no. of scan lines).

Figure 3:
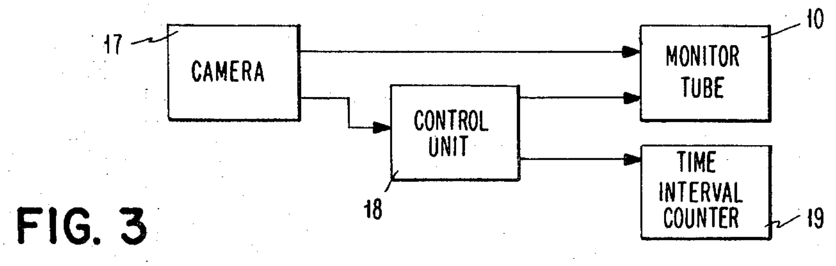
FIG. 3 is a block diagram showing the basic system configuration of the invention.

The basic hardware for the present system configuration is shown in FIG. 3 and comprises primarily a conventional television camera 17 and television monitor tube 10, a control unit 18, and a time interval counter 19. The camera 17 employs the normal vidicon tube used in television transmission systems and the image of the part to be measured is focused on the faceplate of the vidicon which consists of a photoconductive material that converts light patterns into electrical signals. A magnetic deflection and focus field deflects and focuses the beam on the vidicon target in a prescribed pattern. In the present system, the camera used converts the image to an electrical signal with a 20 mHz. bandwidth and this video information is delivered to the monitor tube 10 and to logic circuitry in the control unit 18. A typical camera suitable for such use in the present system is the Series 3200 television camera of COHU Electronics Inc., California, and which is described in their Manual Code No. 6X–402 published in Aug. 1966. Similarly, the associated monitor tube 10 may be COHU's HRM–A Series High-Resolution Monitors described in their Manual Code No. 6X–409 published in Nov. 1965. The scanning action of the camera 17 and monitor 10 are synchronized with the monitor providing a visual display of the specimen to be measured and assisting the operator in premeasure alignment.

A preferred scan pattern for the camera in the present system would be in the order of (*a*) First field—439½ lines; (*b*) Return for second field—439½ to 472½ lines; (*c*) Second field—472½ to 912 lines; and (*d*) Return to first field of next frame—912 to 945 lines. The time required for a field is 16.6 msec. and the pulse width of the vertical blanking signal is 1.16 msec. The video information is amplified before the blanking and synchronizing signals are added and in addition to the composite video signal the camera provides three control signals which are vertical blanking, horizontal blanking and a vertical deflection ramp.

Figure 4:
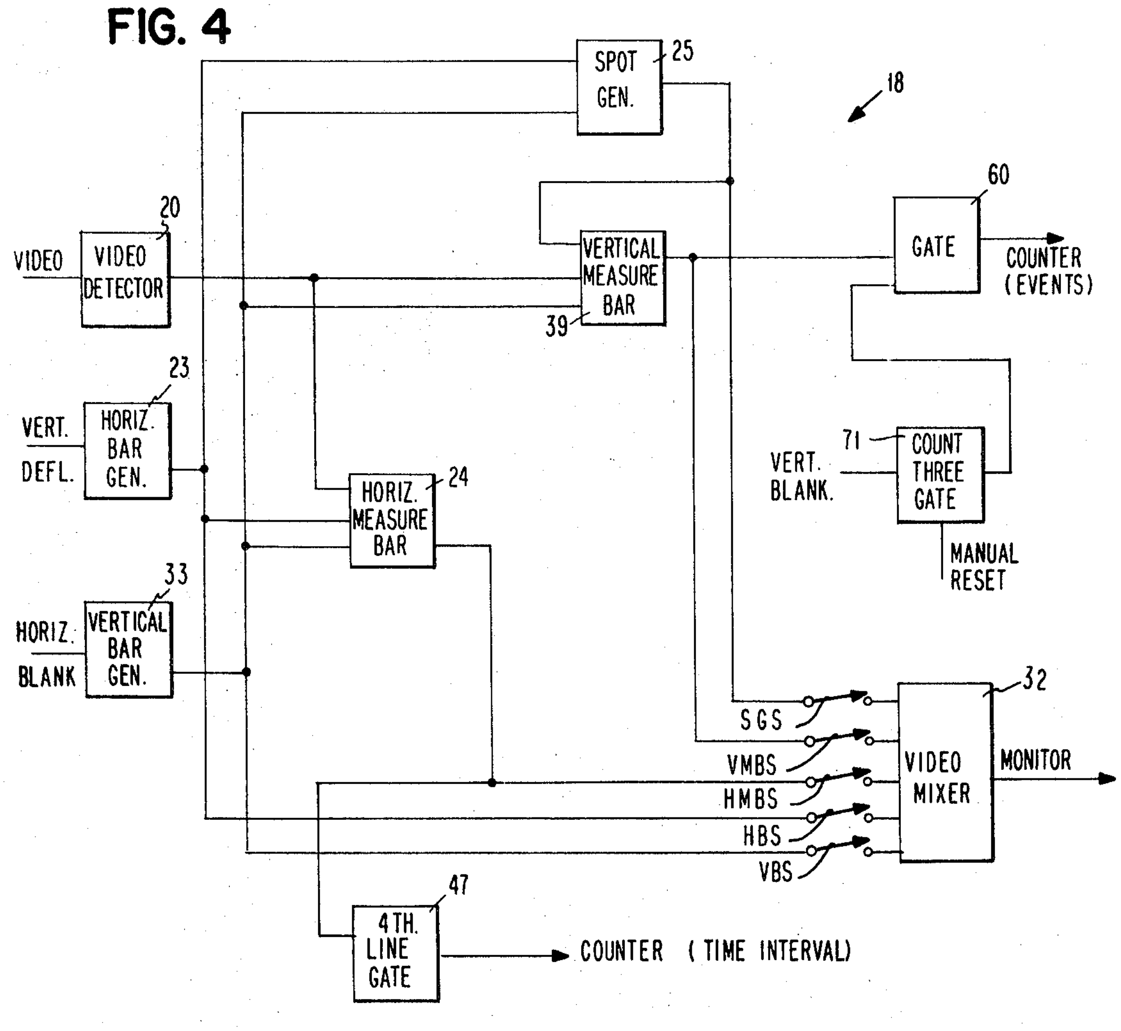
FIG. 4 is a block diagram of the control unit of the system shown in FIG. 3.

Referring to FIG. 4, there is shown in block diagram form the various circuit units which make up the control unit 18. The video, vertical deflection, horizontal blanking, and vertical blanking signals are fed to the control unit from the camera. The control unit allows the operator to select and to perform the measurement and the counter provides the quantitative measurement.

Although not shown, it will be understood that the present system includes the customary control panel having the necessary dial switches and potentiometer dials to enable the operator to selectively control the logic circuits in the control unit 18.

Figure 5:
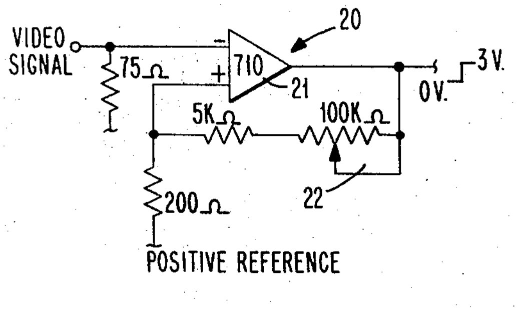
FIG. 5 is a block diagram of the video detector in the control unit.

The video signal is fed from the camera to a video detector 20 in the control unit. The purpose of the video detector is to differentiate between readily defined transitions in the video wave form. The detector circuit is shown in FIG. 5 and it comprises essentially a high speed differential voltage comparator 21. The circuit utilizes feedback to establish hysteresis which is controlled by the 100*k* potentiometer 22. The hysteresis is provided to compensate for any noise that exists in the video signal. One preferred form of comparator suitable for use in this circuit is the well-known Fairchild Semiconductor Type *u*A 710.

Figure 7:
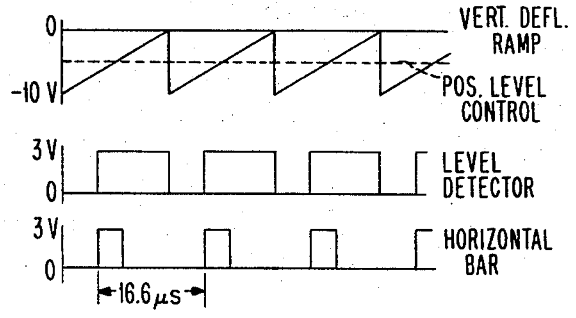
FIG. 7 is a diagram illustrating the wave forms at various points of the circuit shown in FIG. 6.
Figure 6:
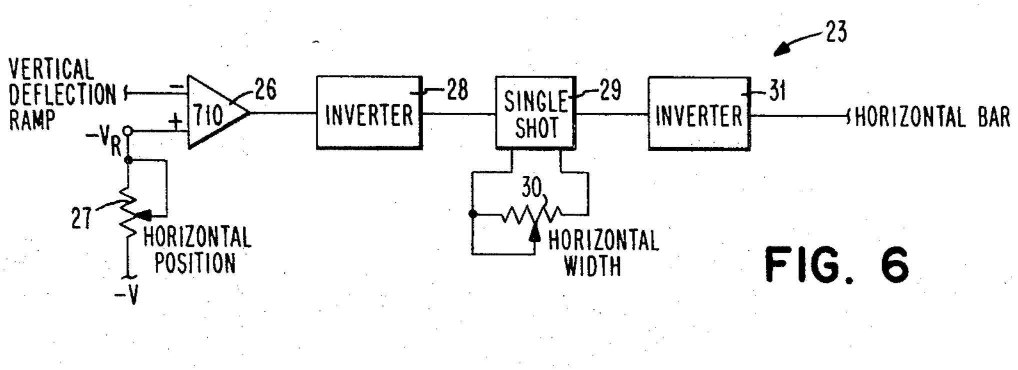
FIG. 6 is a block diagram of the horizontal bar generator in the control unit.

With the system powered on and the selected area to be measured displayed on the screen of monitor tube 10, the operator carries out a horizontal measurement by closing a horizontal bar switch HBS (FIG. 4) to direct the output of a horizontal bar generator 23 in the control unit 18 to the screen of monitor tube 10. The horizontal bar generator receives the vertical deflection signal from the camera and serves to establish a reference in the vertical and horizontal measuring modes and provides information for the horizontal measuring bar circuit unit 24 and the spot generator circuit unit 25. The horizontal bar generator circuit is shown in FIG. 6 and the associated waveforms in FIG. 7. In operation, the vertical defection ramp signal is continuously applied to a level detector 26 which preferrably takes the form of the Fairchild Semiconductor Type *u*A 710 differential voltage comparator. The ramp signal is 16.6 msec. long. The reference voltage $-V_R$ to the level detector is adjusted by means of potentiometer 27 to provide a time to voltage conversion. This changing reference is termed the horizontal position control and it allows the operator to selectively position the horizontal bar on the screen of the monitor tube. When the vertical deflection ramp signal equals the reference voltage level, a change in voltage from the level detector 26 is passed through an inverter 28 and triggers a single-shot 29 which establishes the width of the horizontal bar pulse. This width may be adjusted by means of a potentiometer 30. After passing through an inverter 31, the horizontal bar is transmitted on to a suitable OR switch video mixer device 32 (FIG. 4) and from the video mixer on to the monitor tube 10 for display on the screen, as illustrated for example by the bar 11 in FIG. 1*b*.

Figure 8:
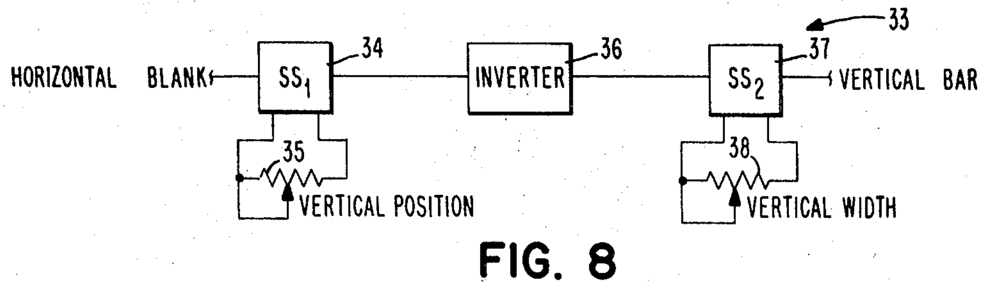
FIG. 8 is a block diagram of the vertical bar generator in the control unit.
Figure 9:
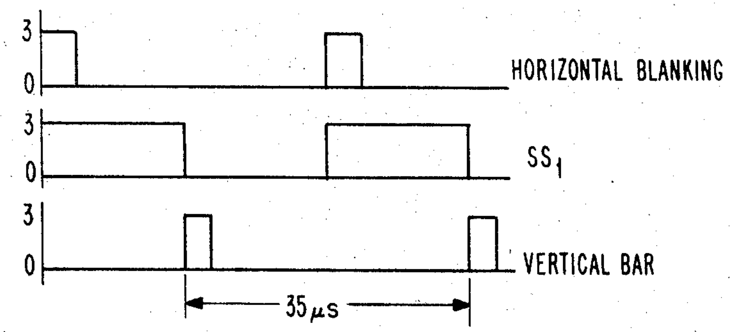
FIG. 9 is a diagram illustrating the wave forms at various points of the circuit shown in FIG. 8.

Also, a vertical bar switch VBS is activated to direct the output from a vertical bar generator 33 in the control unit 18 (FIG. 4) to the monitor tube. The vertical bar generator receives the horizontal blanking signal from the camera and establishes a reference for vertical and horizontal measuring modes and provides information for the vertical measuring bar. Referring to FIGS. 8 and 9, which show the logic circuit and associated wave forms for the vertical bar generator, the horizontal blanking signal is delivered at 0 volts and 3 volts and the leading edge of the blanking signal triggers a single-shot 34 that establishes the location of the vertical bar. The operator can selectively position the location of the vertical bar by means of the potentiometer 35. The trailing edge of single-shot 34 passes through an inverter 36 and triggers another single-shot 37. The pulse width of single-shot 37 establishes the width of the vertical bar and this width may be adjusted by means of potentiometer 38. The vertical bar pulse is then applied to the video mixer 32 (FIG. 4) and transmitted on to the monitor tube 10 for display on the screen, as illustrated, for example, by the vertical bar 12 in FIG. 1*b*. The vertical bar pulse also provides information for the horizontal measurement bar unit 24, the spot generator unit 25 and a vertical measurement bar unit 39 (FIG. 4). By means of the horizontal bar potentiometer 27 and the vertical bar potentiometer 35, the intersection of these bars is positioned to the left of the line to be measured, such as is illustrated for example by the intersection 13 in FIG. 1*c*.

Figure 18:
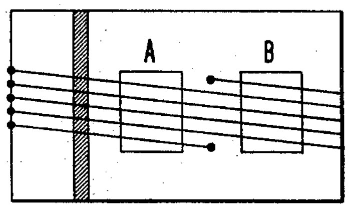
FIG. 18 is a diagram illustrating the generation of the horizontal bar scan lines.

With the horizontal and vertical bars positioned on the screen of the monitor tube, the horizontal bar switch HBS is opened and a horizontal measuring bar switch HMBS is now closed to receive the output of the horizontal measurement bar circuit unit 24 (FIG. 4). The horizontal measurement bar generator provides an indication of the video signal extracted by showing the operator where the measurement is made and it supplies the time interval counter 19 with the extracted video information. Referring to the logic circuit shown in FIG. 10 and the associated wave forms shown in FIG. 11, the occurrence of the horizontal and vertical bars activates an AND switch 40 the output of which sets a first latch 41. When the video pulse occurs, its presence along with the output from latch 41 activates an AND switch 42 the output of which sets a second latch 43. The output of latch 43 in its set condition starts the horizontal measurement bar pulse which is transmitted to an AND switch 44. A third latch 45, which at this time is in a reset condition, has its output inverted by an inverter 46 and taken to the AND switch 44 to activate the switch whereupon it gates the horizontal measurement bar pulse to the video mixer 32 (FIG. 18) and on to the screen of the monitor tube 10. As will be described more fully later, the horizontal measurement bar pulse is also transmitted by way of a 4th line gate 47 to the time-interval counter 19. As the video pulse ends, it is inverted by an inverter 49 (FIG. 10) and activates an AND switch 50 the output of which sets the latch 45 to turn off the AND gate 44 thus terminating the horizontal measurement bar pulse, as shown in FIG. 11. At the end of each raster line, the horizontal blanking signal from the camera resets the latches 41, 43 and 45. The horizontal measurement bar pulse represents the width of the pulse taken from the video signal and it will appear on the monitor screen as an overlay to shown the operator where the measurement starts and stops, as illustrated, for example, by the bar 14 in FIG. 1*d*. To enable this small precise bar to be clearly seen on the screen, the horizontal bar switch HBS was opened to remove the longer horizontal bar from the monitor screen while the measuring bar remains on. The position of this measuring bar is selectively controlled by the operator by means of the horizontal bar potentiometer 27 (FIG. 6).

To carry out a vertical measurement, the horizontal bar switch HBS would be open and the vertical bar switch VBS and the spot generator switch SGS would be closed to direct the outputs from the vertical bar generator 33 and the spot generator 25 in the control unit 18 (FIG. 4) to the monitor. The vertical bar is generated and displayed on the monitor screen in the same manner as was described for a horizontal measurement. Also the pulses form the horizontal bar generator 23 and the vertical bar generator 33 are transmitted to the spot generator 25 which functions to provide a reference for the vertical measuring mode and to determine where the vertical measuring bar starts. Referring to the spot generator circuit shown in FIG. 12 and the associated wave forms shown in FIG. 13, the occurrence of the vertical bar and horizontal bar pulses activates an AND switch 51 the output of which triggers a single shot 52 which generates the spot bar pulse. The size of the spot may be controlled by the potentiometer 53. It should be noted that the length of the spot is determined by the single shot while the width and position of the spot is determined by the horizontal pulse. The spot bar pulse is transmitted to the video mixer 32 (FIG. 4) and on to the screen of the monitor tube 10 and there is shown on the screen the vertical bar and spot bar, such as is illustrated for example by the vertical bar 12 and spot bar 15 in FIG. 2*b*. The vertical bar is then positioned over the line to be measured by means of the potentiometer 35 (FIG. 8) and the spot bar is moved such that it intersects the top edge of the line to be measured, such as is illustrated for example at line *b* in FIG. 2*c*. The spot bar automatically follows the vertical bar with the spot moving up and down the vertical bar as the vertical bar is adjusted across the screen.

Figure 14:
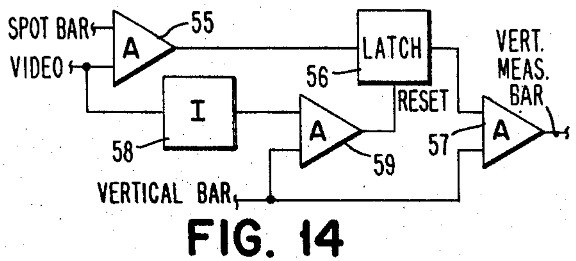
FIG. 14 is a block diagram of the vertical measurement bar generator in the control unit.
Figure 15:
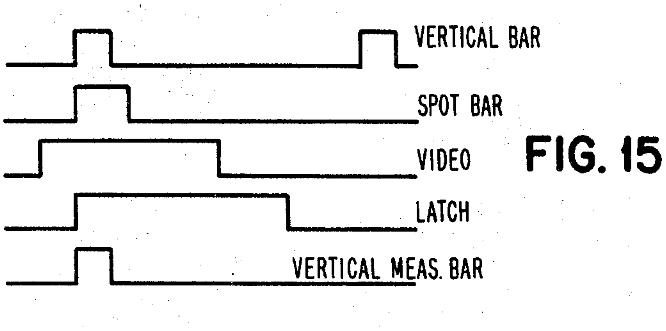
FIG. 15 is a diagram illustrating the wave forms at various points of the circuit shown in FIG. 14.

With the vertical bar and spot bar positioned on the monitor tube screen, the vertical bar switch VBS and spot bar switch SGS are opened and a vertical measurement bar switch VMBS is closed to receive the outputs from a vertical measurement bar circuit unit 39 (FIG. 4). The vertical measurement bar generator severs to provide an indication of the video information extracted and supplies pulses to the time interval counter 19 in an events mode. The sum of the pulses is correlated to a linear measurement limited by the resolution of the camera. Referring to the logic circuit shown in FIG. 14 and the associated waveforms shown in FIG. 15, the occurrence of the sport bar pulse and a video pulse will activate an AND switch 55 the output of which sets a latch 56. The output from the latch is gated by an AND switch 57 to form the vertical measuring bar pulse. Latch 56 is reset by means of an inverter 58 and an AND switch 59 when the first vertical bar pulse appears in the absence of a video pulse. The reset of the latch 56 will turn off a gate 60 to the events counter. The vertical measuring bar pulse is transmitted to the video mixer 32 and on to the screen of the monitor tube 10 to shown the operator where the measurement is being taken, as illustrated for example by the bar 16 shown in FIG. 2d. In order to clearly see the measuring bar, the vertical bar and spot bar switches were opened to remove the vertical bar and spot bar from the screen while the vertical measuring bar remains on. The position of this measuring bar is selectively controlled by the operator by means of the vertical bar potentiometer 35.

Thus far there has been shown how the operator selects whether a horizontal or a vertical measurement is to be made and how an overlay is displayed to assure the operator that the measurement is being taken from the desired position. After selection, the measurements are carried out in repetitive fashion dependent of human judgment and are observed on a digital readout.

As was mentioned, the horizontal measurement is made by measuring the width of a pulse taken from the video signal. Referring to FIG. 4, the horizontal measuring bar pulses are transmitted to the 4th line gate 47 the purpose of which is to insure that the correct video information is gated to the time interval counter. This is necessary in the present system because in the method employed to generate the horizontal bar, the horizontal bar is not synchronized to the horizontal blanking signal. Referring to the illustration shown in FIG. 18, the conditions for the measurement to be properly made are that the vertical and horizontal bars occur before the image to be measured. In the illustration the operator wishes to measure bar A; however, if the first scan line in the horizontal bar were used, then bar B would be measured. Therefore, to be sure that this condition does not occur the fourth scan line in the horizontal bar is selected by the gate. Actually, the 4th line gate could be eliminated by synchronizing to the horizontal and the measurement made from the first full scan line.

Figure 16:
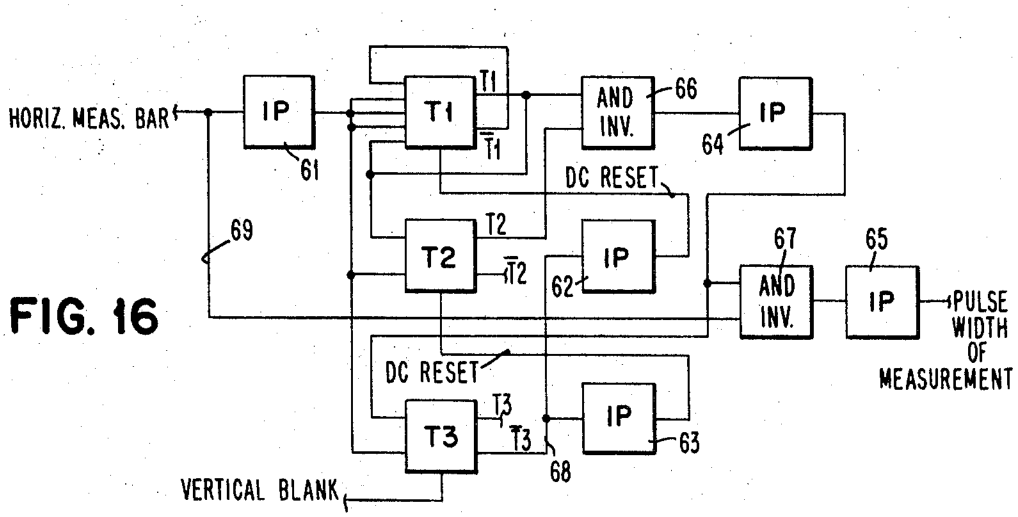
FIG. 16 is a block diagram of the fourth pulse gate in the control unit.
Figure 17:
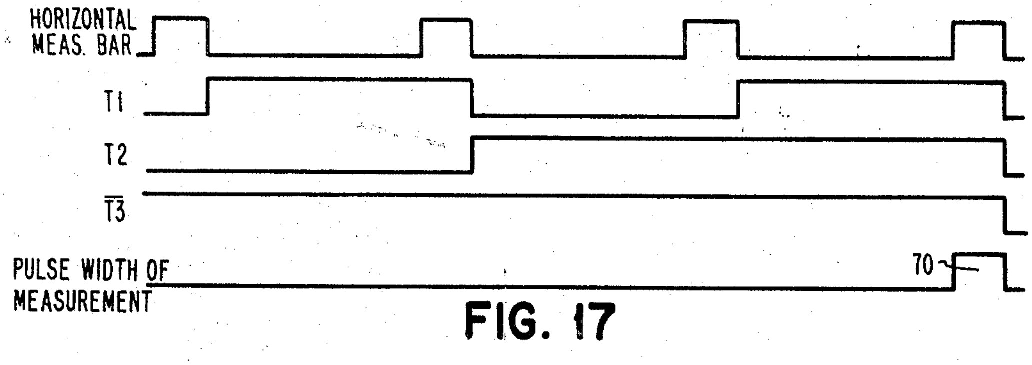
FIG. 17 is a diagram illustrating the wave forms at various points of the circuit shown in FIG. 16.

Referring to the logic circuit and associated waveforms shown in FIGS. 16 and 17, the 4th line or pulse gate 47 comprises a trigger T1 which runs as a flip-flop, triggers T2 and T3 which operate as latches, the power inverters 61, 62, 63, 64 and 65 and the positive AND switch and inverter blocks 66 and 67. In operation, trigger T1 is normally off and the trailing edge of the first horizontal measuring bar pulse is inverted by inverter 61 resulting in a positive going edge which turns trigger T1 on. The output from trigger T1 will remain positive until another measuring bar pulse comes along. Trigger T2 is also normally off and when the second measuring bar pulse occurs its inverted trailing edge will latch trigger T2 on and trigger T1 will turn off. Trigger T3, which is used for reset purposes, was previously latched off by the vertical blanking signal from the camera and there will be a positive output on its bottom not output line 68. The inverted trailing edge of the the third measuring bar pulse turns on trigger T1 while trigger T2 remains latched on and trigger T3 remains latched off. With both triggers T1 and T2 turned on, positive outputs are applied to the positive AND switch and inverter block 66 and the resulting negative output from block 66 is changed to positive by inverter 64 and applied to the positive AND switch and inverter block 67. Now when the forth measuring bar pulse arrives, it is transmitted by line 69 to the block 67, gated through, and inverted by inverter 65 to provide output pulse 70 which is the pulse width of measurement. The trailing edge of the fourth horizontal measuring bar pulse will turn trigger T3 on to reset triggers T1 and T2.

The width of measurement pulses 70 are transmitted to the time interval counter 19 (FIG. 3) which provides the operator with a digital readout. The details of the time interval counter are not shown since such counters are well-known in the art. It will be understood that the counter used in the present system has the capability of controlling where on the positive going edge of a pulse to start a clock and where on the negative going edge of the pulse to stop the clock. The frequency of the clock is a measure of the pulse width entering the counter. An example of one such counter suitable for use in the present system is the Computer Measurements Company Model 800 Electronic Counter which is described in their Manual 833A published in Dec. 1965. In this counter the time interval between two points on the same or different waveforms is read directly in microseconds, milliseconds, or seconds as selected by a time base switch which determines the resolution of the measurement by selecting the clock frequency which is counted in the time interval. Decimal point positioning is automatic to provide a direct readout in the units displayed on the counter enunciator.

The vertical measurement is made by counting the number of horizontal scan lines and to carry this out the vertical measuring bar pulses from the vertical measuring bar generator 39 (FIG. 4) are taken to the gate 60 which is an AND switch. There is also fed to gate 60 the output from a count three gate 71 which is used to gate only one frame of vertical measuring pulses to the events counter. This requires that two fields must be counted. Accordingly, the count three gate takes the form of a conventional 2-bit binary counter comprising two flip-flop stages which are controlled by the vertical blanking signal from the camera. The two blanking signals for the first and second fields of the frame will cause the binary counter to close gate 60 to gate the measuring bar pulses to the events counter and the next blanking signal for the first field of the next frame will cause gate 60 to open.

The events counter in the present system is the time interval counter 19 described above except that for vertical measurements the counter is switched to an events or totalizing mode. The total count of electrical events over any desired period of time is obtained by setting a gate switch on the counter to open to start the totalizing and setting it to auto when the totalizing is to stop. During the time that the gate switch is set to open, all input signal pulses are counted.

The time interval counter provides a four-line binary-coded decimal output and decimal point output at a printer connector and these outputs may be supplied to a printer, tape-punch adapter, computer, recorder, or other external device. Generally a measurement is made on a repetitive basis, for example 10 times, and an average measurement computed.

To eliminate an operator from selecting the object to measure, a mechanical scanner could be adapted. Thus, by knowing the grid size and the line location an *x–y* positioning table could be programmed to scan the part. This would provide information about the line size and the location of where the measurement was made.

The present system has the advantage of being particularly suited to microscopic measurements and it is adapted to be tied in with a manufacturing process to monitor measurements and provide feedback control.

While the invention has been particularly shown and described with reference to a preferred embodiment thereof, it will be understood by those skilled in the art that various changes in form and details may be made therein without departing from the spirit and scope of the invention.

We claim:

1. A television measurement system for making linear measurements of an optical image in either a vertical or horizontal direction comprising;

- a television camera for scanning line by line and field by field the image to be measured and which provides vertical blanking, horizontal blanking and vertical deflection control signals in addition to the video signals;
- a monitor tube synchronized with said camera for visually displaying the image being scanned;
- means responsive to said control signals for generating display bars which establish references for the horizontal and vertical measuring modes;
- means for selectively displaying said bars on said monitor;
- means for selectively positioning the location of said display bars adjacent the image to be measured to extract a video signal corresponding to the width and height of said image;

means for automatically making a horizontal measurement by measuring the width of the extracted video signal;

means for automatically making a vertical measurement by counting the number of horizontal scan lines in the height of the extracted video signal; and means for providing a digital readout of said measurements.

2. A television measurement system for making linear measurements of an optical image in either a vertical or horizontal direction comprising;

a television camera for scanning line by line and field by field the image to be measured and which provides vertical blanking, horizontal blanking and vertical deflection control signals in addition to the video signals;

a monitor tube synchronized with said camera for visually displaying the image being scanned;

means responsive to said control signals for generating display bars which establish references for the horizontal and vertical measuring modes;

means for selectively displaying said bars on said monitor;

means for selectively positioning the location of said display bars adjacent the image to be measured to extract a video signal corresponding to the width and height of said image;

means controlled by said display bars and the extracted video signal for generating a measurement bar which is displayed on the monitor as an overlay showing where the measurement is being taken;

means for automatically making a horizontal measurement by measuring the width of the extracted video signal;

means for automatically making a vertical measurement by counting the number of horizontal scan lines in the height of the extracted video signal; and means for providing a digital readout of said measurements.

3. A television measurement system for making linear measurements of an optical image in either a vertical or horizontal direction comprising;

a television camera for scanning line by line and field by field the image to be measured and which provides vertical blanking, horizontal blanking and vertical deflection control signals in addition to the video signals;

a monitor tube synchronized with said camera for visually displaying the image being scanned;

means responsive to said control signals for generating horizontal bar, vertical bar and spot bar pulses which establish references for the horizontal and vertical measuring modes;

switching means for selectively transmitting said horizontal bar, vertical bar and spot bar pulses to said monitor tube to display a horizontal bar and a vertical bay preparatory to making a horizontal measurement or a vertical bar and a spot bar preparatory to making a vertical measurement;

adjustable means for positioning the location of said bars whereby the horizontal bar and vertical bar will be positioned to intersect to the left of the portion of the image which is to be measured horizontally or the vertical bar will be positioned over the portion of the image to be measured vertically with the spot bar positioned to intersect the top edge of this image portion;

means responsive to said video signals, horizontal bar pulses and vertical bar pulses for generating horizontal measuring bar pulses which represent the width of the video pulse which is to be measured horizontally;

means responsive to said video signals, vertical bar pulses and spot bar pulses for generating vertical measuring bar pulses which represent the video pulse which is to be measured vertically; and a time interval counter operable in a time interval mode to receive said horizontal measuring bar pulse and provide a digital readout of their width which represents the horizontal measurement of the extracted video pulse, said counter being switchable to an events mode to receive said vertical measuring bar pulses and provide a digital readout of the total number of horizontal scan lines which represent the vertical measurements of the extracted video pulse.

4. A television measurement system for making linear measurements of an optical image in either a vertical or horizontal direction comprising;

a television camera for scanning line by line and field by field the image to be measured and which provides vertical blanking, horizontal blanking and vertical deflection control signals in addition to the video signals;

a monitor tube synchronized with said camera for visually displaying the image being scanned;

means responsive to said control signals for generating horizontal bar, vertical bar and spot bar pulses which establish references for the horizontal and vertical measuring modes;

switching means for selectively transmitting said horizontal bar, vertical bar and spot bar pulses to said monitor tube to display a horizontal bar and a vertical bar preparatory to making a horizontal measurement or a vertical bar and a spot bar preparatory to making a vertical measurement;

adjustable means for positioning the location of said bars whereby the horizontal bar and vertical bar will be positioned to intersect to the left of the portion of the image which is to be measured horizontally or the vertical bar will be positioned over the portion of the image to be measured vertically with the spot bar positioned to intersect the top edge of this image portion;

means responsive to said video signals, horizontal bar pulses and vertical bar pulses for generating horizontal measuring bar pulses which represent the width of the video pulse which is to be measured horizontally;

means responsive to said video signals, vertical bar pulses and spot bar pulses for generating vertical measuring bar pulses which represent the video pulse which is to be measured vertically;

switching means for selectively transmitting said horizontal measuring bar and vertical measuring bar pulses to said monitor tube to display an overlay on the image which shows where the measurement is being taken; and a time interval counter operable in a time interval mode to receive said horizontal measuring bar pulses and provide a digital readout of their width which represents the horizontal measurement of the extracted video pulse, said counter being switchable to an events mode to receive said vertical measuring bar pulses and provide a digital readout of the total number of horizontal scan lines which represent the vertical measurement of the extracted video pulse.

5. A television measurement system for making linear measurements of an optical image in either a vertical or horizontal direction comprising;

a television camera for scanning line by line and field by field the image to be measured and which provides vertical blanking, horizontal blanking and vertical deflection control signals in addition to the video signals;

a monitor tube synchronized with said camera for visually displaying the image being scanned;

horizontal bar generator means responsive to said vertical deflection signals for generating horizontal bar pulses;

vertical bar generator means responsive to said horizontal blanking signals for generating vertical bar pulses;

a video detector for receiving said video signals;

spot bar generator means responsive to said horizontal bar and vertical bar pulses for generating spot bar pulses;

switching means for selectively transmitting said horizontal bar, vertical bar and spot bar pulses to said monitor tube to display a horizontal bar and a vertical bar preparatory to making a horizontal measurement or a vertical bar and a spot bar preparatory to making a vertical measurement;

adjustable means for positioning the location of said bars whereby the horizontal bar and vertical bar will be positioned to intersect to the left of the portion of the image which is to be measured horizontally or the vertical bar will be positioned over the portion of the image to be measured vertically with the spot bar positioned to intersect the top edge of this image portion;

a horizontal measuring bar generator responsive to said video detector, horizontal bar pulses and vertical bar pulses for generating horizontal measuring bar pulses which represent the width of the video pulse which is to be measured horizontally;

a vertical measuring bar generator responsive to said video detector, vertical bar pulses and spot bar pulses for generating vertical measuring bar pulses which represent the video pulse which is to be measured vertically; and a time interval counter operable in a time interval mode to receive said horizontal measuring bar pulses and provide a digital readout of their width which represents the horizontal measurement of the extracted video pulse, said counter being switchable to an events mode to receive said vertical measuring bar pulses and provide a digital readout of the total number of horizontal scan lines which represent the vertical measurement of the extracted video pulse.

6. A television measurement system as set forth in claim 5 and including switching means for selectively transmitting said horizontal measuring bar and vertically measuring bar pulses to said monitor tube to display an overlay on the image which shows where the measurement is being taken.

7. A television measurement system for measuring the width of printed circuit lines in either a vertical or horizontal direction comprising;

a television camera for scanning line by line and field by field the image to be measured and which provides vertical blanking, horizontal blanking and vertical deflection control signals in addition to the video signals;

a monitor tube synchronized with said camera for visually displaying the image being scanned;

a first single-shot circuit responsive to said vertical deflection signals for generating horizontal bar pulses which establish a reference for the horizontal and vertical measuring modes;

a second single-shot circuit responsive to said horizontal blanking signals for generating vertical bar pulses which establish a reference for the horizontal and vertical measuring modes;

a third single-shot circuit responsive to said horizontal bar and vertical bar pulses for generating spot bar pulses which establish a reference for the vertical measuring mode;

a video detector for receiving said video signals;

switching means for selectively transmitting said horizontal bar, vertical bar and spot bar pulses to said monitor tube to display a horizontal bar and a vertical bar preparatory to making a horizontal measurement of a vertical bar and a spot bar preparatory to making a vertical measurement;

adjustable potentiometer means for positioning the location of said bars whereby the horizontal bar and vertical bar will be positioned to intersect to the left of the printed-circuit line in the image which is to be measured in the horizontal direction or the vertical bar will be positioned over the printed-circuit line which is to be measured in a vertical direction with the spot bar positioned to intersect the top edge of this line;

a first latch circuit responsive to said video detector, horizontal bar pulses and vertical bar pulses for generating horizontal measuring bar pulses which represent the width of the video pulse extracted when scanning the width of the line being measured in the horizontal direction;

a second latch circuit responsive to said video detector, vertical bar pulses and spot bar pulses for generating vertical measuring bar pulses which represent the video pulse extracted when scanning the line being measured in the vertical direction; and a time interval counter operable in a time interval mode to receive said horizontal measuring bar pulses and provide a digital readout of their width which represents the horizontal measurement of the extracted video pulse, said counter being switchable to an events mode to receive said vertical measuring bar pulses and provide a digital readout of the total number of horizontal scan lines which represents the vertical measurement of the extracted video pulse.

8. A television measurement system as set forth in claim 7 and including switching means for selectively transmitting said horizontal measuring bar and vertical measuring bar pulses to said monitor tube to display an overlay bar on the line being measured which shows where on the line the measurement is being taken.

9. A television measurement system as set forth in claim 7 characterized by a fourth line gating trigger circuit for gating every fourth horizontal bar pulse to said time interval counter to insure that the correct video information is being measured.

10. A television measurement system as set forth in claim 7 characterized by a 2–bit binary counter gating circuit for gating only one frame of vertical measuring bar pulses to said time interval counter.